Sept. 20, 1966 A. S. CRAVEN, JR 3,273,613
PORTABLE SAW GUIDE AND WORK HOLDER
Filed May 18, 1964 3 Sheets-Sheet 1

INVENTOR.
AARON SANFORD CRAVEN, JR.
BY
Walter B. Udell
ATTORNEY

Sept. 20, 1966 A. S. CRAVEN, JR 3,273,613
PORTABLE SAW GUIDE AND WORK HOLDER
Filed May 18, 1964 3 Sheets-Sheet 2

INVENTOR.
AARON SANFORD CRAVEN, JR.
BY
ATTORNEY

Sept. 20, 1966  A. S. CRAVEN, JR  3,273,613
PORTABLE SAW GUIDE AND WORK HOLDER
Filed May 18, 1964  3 Sheets-Sheet 3
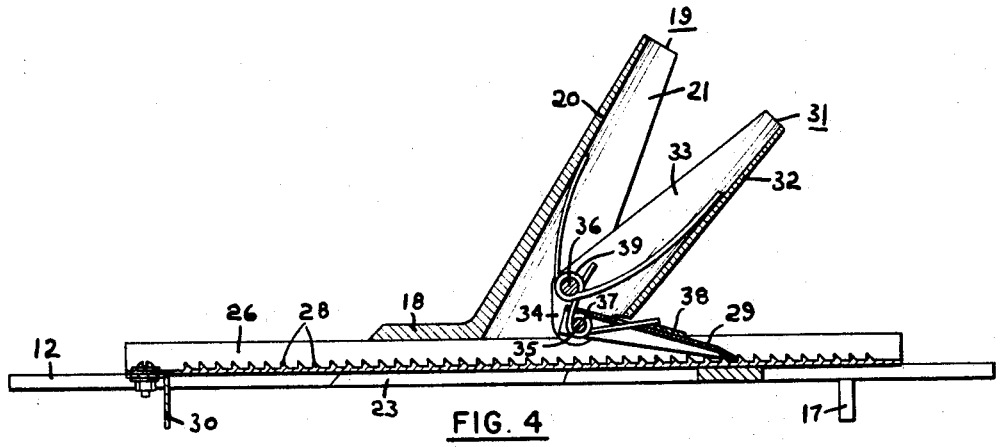
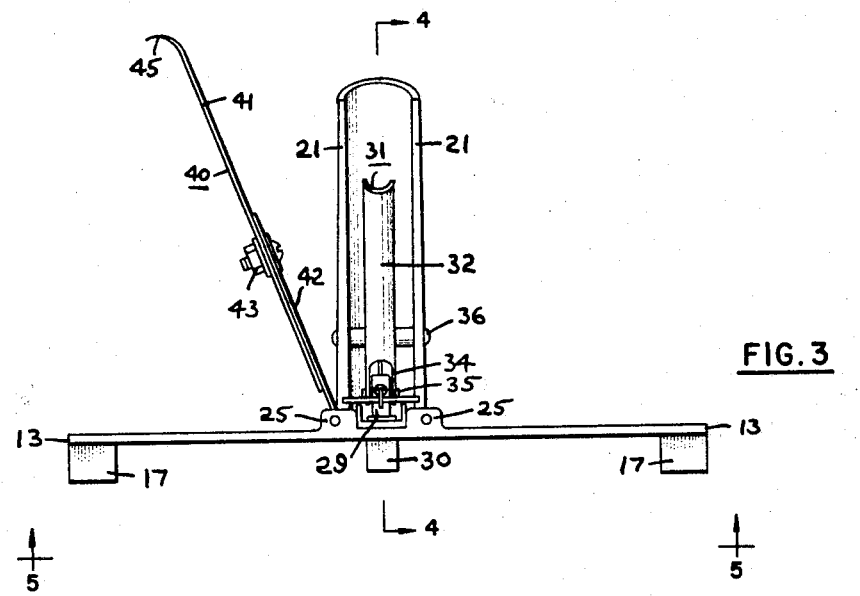
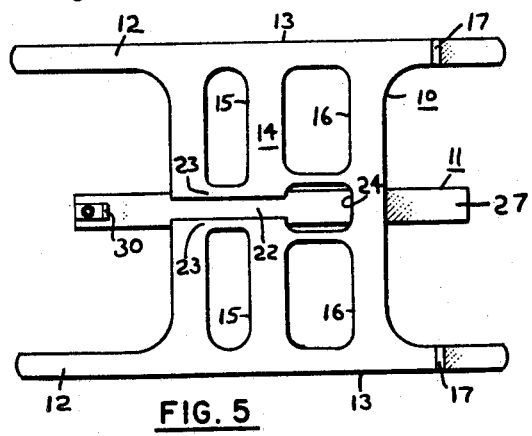
INVENTOR.
AARON SANFORD CRAVEN, JR.
BY
*Walter B. Udell*
ATTORNEY

United States Patent Office 3,273,613
Patented Sept. 20, 1966

3,273,613
PORTABLE SAW GUIDE AND WORK HOLDER
Aaron Sanford Craven, Jr., 505 Independence Ave.,
Philadelphia, Pa.
Filed May 18, 1964, Ser. No. 367,971
12 Claims. (Cl. 143—167)

This invention relates generally to saw guides, and more particularly, relates to a combination saw guide and portable work holder which includes guiding edges against which hand held and operated power saws are positionable, and against which the saw may be held as the entire cutting operation is carried out while at the same time providing a work securing and handling function.

In the past, saw guiding devices have been known which may be secured to a piece of stock to be cut in such manner as to provide a guide edge for a saw. Unfortunately, such known types of guide devices have either been fixedly secured to the work by clamping devices requiring time consuming securement procedures, as by utilization of screw jack clamps, or have been of such nature that they must be carefully held in the desired position in order to avoid shifting relative to the work to be cut. The combination guide and work holder according to the invention is not so limited, being quickly and accurately securely clampable to the work piece while also being immediately releasable from the work so as to be quickly shiftable to any other desired position and immediately reclampable upon the work. Accordingly, it is a primary object of my invention to provide a novel saw guide and work holder which provides a work piece securing or clamping function allowing operations on saw horses, plain tables or work benches without requiring work stops, jigs or clamps by providing means for effectively resisting the thrust of a cutting or sawing tool.

Another object of my invention is to provide a novel saw guide and work holder which provides a work handling function so that cut-off lengths of the work may be grouped in an ordered stack and prevented from merely falling into a pile, such work handling function also minimizing drop-off splintering which frequently occurs at the termination of a wood sawing cut if particular care is not exercised.

Still another object of this invention is to provide a novel saw guide and work holder as aforesaid including a dual guiding feature to facilitate use by either right handed or left handed operators and to provide high precision cutting accuracy comparable to metal machining practices by inclusion of a self aligning feature.

Yet another object of my invention is to provide a novel saw guide and work holder as aforesaid which makes possible coincidental cuts from opposite sides of a piece of work to thereby effectively double the depth of cut capacity of a saw.

The foregoing and other objects of my invention will become clear from a reading of the following specification in conjunction with an examination of the appended drawings, wherein:

FIGURE 3 is an end elevational view of the saw guide and work holder as would be seen when looking into the near end of the device as shown in FIGURE 1;

FIGURE 4 is a longitudinal vertical sectional view through the saw guide and work holder as would be seen when viewed along the line 4—4 of FIGURE 3; and FIGURE 5 is a bottom plan view of the device as would be seen when viewed along the lines 5—5 of FIGURE 3.

In the several figures, like elements are denoted by like reference characters.

Figure 1:
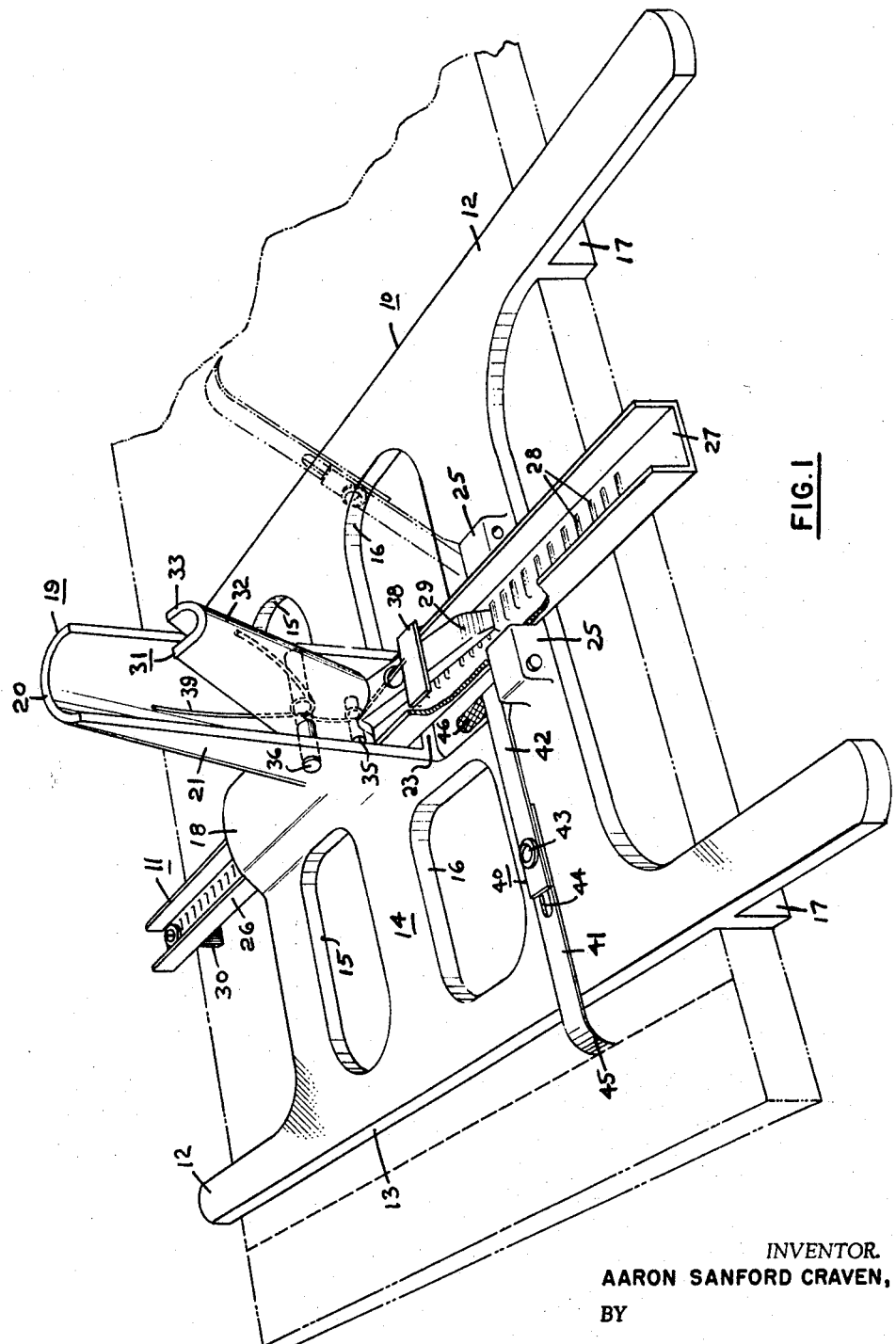
FIGURE 1 is a perspective view looking downward from one end of the saw guide and work holder according to the invention.
Figure 2:
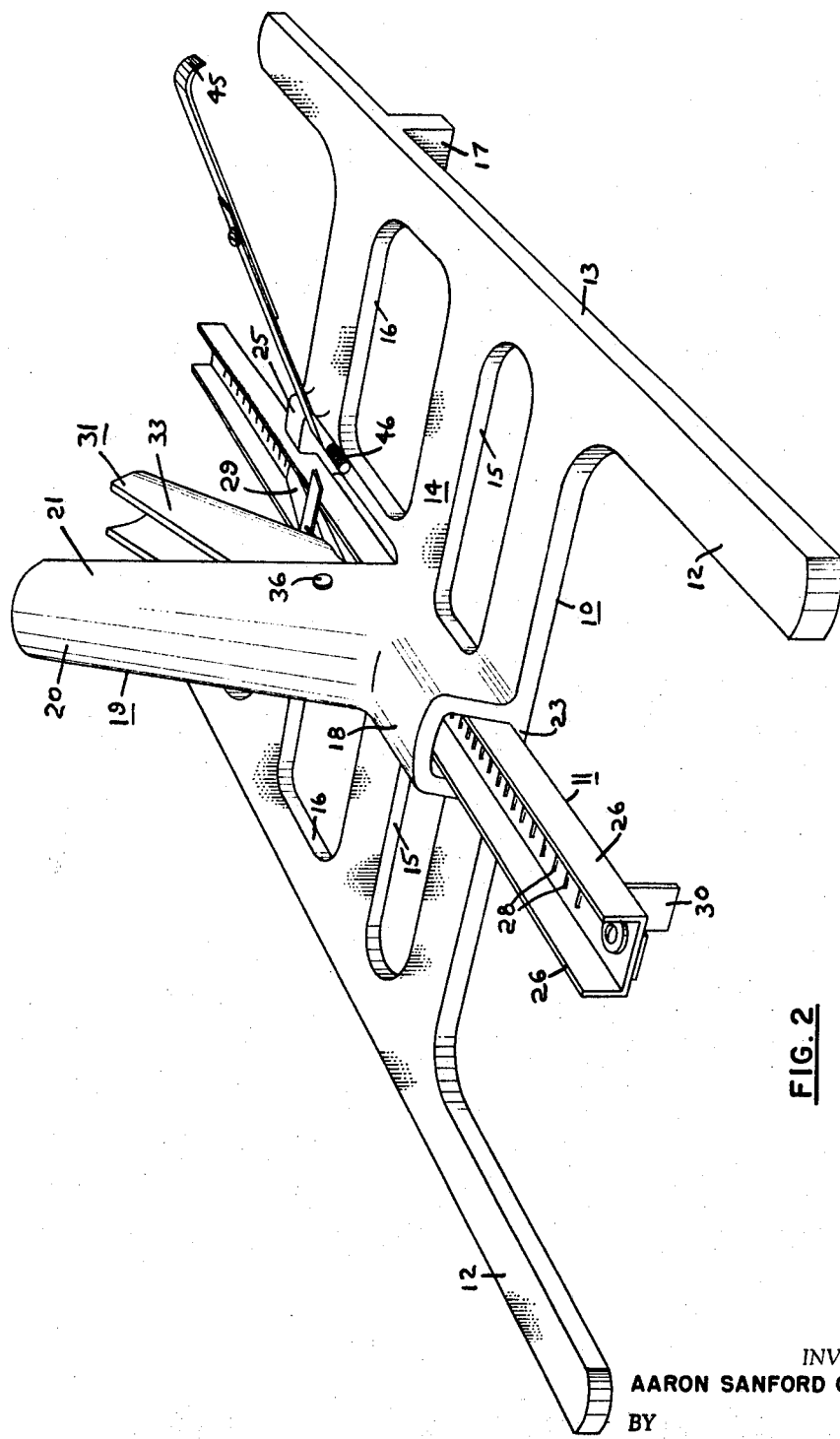
FIGURE 2 is a perspective view of the saw guide and work holder according to the invention as would be seen when viewed from the opposite direction to that shown in FIGURE 1.

Turning now to the drawings, and considering first FIGURES 1, 2 and 5, it is observed that the saw guide and work holder includes a main body portion designated generally as 10, a longitudinally shiftable channel member designated generally as 11, a handle operated ratcheting assembly and a mark pick-up.

The main body portion 10 is generally of H-shape configuration, having a pair of longitudinally parallel extending side marginal parts 12 formed with rectilinearly extending outside lateral edges 13, the side marginal parts 12 being fixedly secured together by a web 14 bridging therebetween. The undersurface of the web 14 and side marginal parts 12 are coplanar so that the entire main body portion 10 may be seated flat-wise down upon the flat surfaced stock which it is desired to clamp and cut, large areas of the web 14 being cut out as at 15 and 16 in order to decrease the weight of the unit and also to provide better visibility of the underlying stock which is being worked upon. Depending from the undersurface of each of the side marginal parts 12 proximate what will be hereinafter termed the front end thereof, are alignment stops 17 so formed and positioned that the rear faces thereof are disposed in a plane which is perpendicular to the rectilinear outside lateral edges 13 of the side marginal parts 12. It will be thus understood that, as shown in FIGURE 1, abutment of the rear faces of the alignment stops 17 against one edge or face of a plank for example, automatically aligns the lateral edges 13 of the side marginal parts 12 at a right angle to the face or edge abutted by the alignment stops 17.

Extending longitudinally substantially above the web 14 for approximately half the length of the web is a tunnel housing 18 from which upwardly angularly extends an arcuate handgrip 19 of C-shape or U-shape in horizontal cross section oriented so that the curved surface 20 faces toward the rear end of the device and the side walls 21 are substantially parallel to the lateral edges 13. The curved surface 20 of the handgrip 19 fits conveniently and comfortably against the palm of the hand of the person using the combination guide and work holder. As is perhaps best seen in the showing of FIGURE 5, that portion of the web 14 which directly underlies the tunnel housing 18 and handgrip 19 is longitudinally slotted as at 22 with the slot being narrower than the width of the tunnel through the housing 18 so that a portion of the web 14 extends laterally inward from each side of the tunnel housing 18 to form a pair of longitudinally extending and inwardly projecting ledges or shoulders 23 whose longitudinally extending spaced apart parallel facing edges define the slot 22. The forward edges of the shoulders 23 terminate at a point substantially in line with the rear edges of the web cutouts 16, and the web 14 is laterally outwardly and forwardly cut away to form a cut-out 24 having its forward edge substantially in line with the forward edges of the web cut-outs 16. Projecting upward from the upper surface of the web 14 immediately adjacent to the forward edge of the web are a pair of laterally spaced bosses 25. The bosses 25 are spaced apart so that their vertically extending facing parallel walls are respectively longitudinallly aligned with the longitudinally extending parallel facing inside wall surfaces of the tunnel housing 18.

Extending longitudinally through the tunnel housing 18 and between the bosses 25, in overlying relationship to the upper surface of the web 14 between the bosses 25 and the shoulders 23 beneath the tunnel housing 18 and handgrip 19, is the U-shaped channel member 11 having channel side walls 26 and a channel bottom wall 27. The side walls 26 are laterally spaced apart so that the distance between their outer faces is just slightly less than the lateral distance between the facing inside walls of the tunnel housing 18 and bosses 25, so that the channel member 11 is free to shift longitudinally through the tunnel housing 18 and between the bosses 25 without binding and with substantially no lateral play. The upper surface of the channel bottom wall 27 is provided at equal longitudinally spaced intervals with rack teeth 28 adapted to be engaged on their rear faces by the leading edge of a pawl 29, operable in a manner to be described to drive the channel member 11 toward the fore end of the guide and work holder device under the control of the operator.

Fixedly secured to and depending from the underside of the channel bottom wall 27 proximate the rear end thereof is a clamping stop 30, the maximum width of the clamping stop being less than the width of the slot 22 between the facing edges of the shoulders 23 so that, as best seen in FIGURE 5, the channel member 11 may be driven forward until the clamping stop 30 passes longitudinally completely through the slot 22 and cut-out 24 into abutment with the edge of the web 14 which defines the front edge of the cut-out 24. It will thus be appreciated that an extremely wide range of work piece widths may be accommodated between the rear faces of the alignment stops 17 and the clamping stop 30. The pawl actuating mechanism for driving the rack channel member 11 into clamping engagement with the work piece is most clearly seen in the showings of FIGURES 1, 3 and 4 to which attention should be now directed.

Disposed between the side walls 21 of the arcuate handgrip 19 and above the rear end of the pawl 29 is an arcuate fingergrip 31 of C-shape or U-shape in horizontal section having a curved forward surface 32 and a pair of flat side walls 33. The side walls 33 terminate at their lower ends in a pair of depending ears 34 which extend downward alongside the rear side edges of the pawl 29 to points of termination lower than the bottom edge of the curved surface 32 of the fingergrip 31. Projected through the side walls of the pawl 29 proximate the rear end thereof and also passing through the depending ears 34 of the arcuate fingergrip side walls 33 is a pin 35 which pivotally secures the rear end of the pawl 29 between the aforesaid side wall ears 34 in a clear position above the rack teeth 28. Similarly, a pivot pin 36 passes laterally through the side walls 21 of the arcuate handgrip 19 and the side walls 33 of the arcuate fingergrip 31 at a point spaced above the pivot pin 35. Motion of the upper end of the fingergrip 31 toward the handgrip 19 rotates the pivot pin 35 about the pin 36 in a counter-clockwise sense to thereby drive the pawl 29 in a forward direction and shift the rack channel 11 forward to thereby move the clamping stop 30 toward the alignment stops 17.

The front end of the pawl 29 is biased downward behind the rack teeth 28 onto the channel bottom wall 27 by the torsion spring element 37 wrapped about the pin 35 with its opposite ends respectively engaged against the pin 36 and the cross piece 38 secured upon and extending transversely of the pawl 29. The fingergrip 31 is biased away from the handgrip 19 by means of a torsion spring 39 disposed about the pin 36 and having its opposite ends engaged respectively with the inside surfaces of the handgrip and fingergrip curved surfaces 20 and 32. The fingergrip 31 is thus biased for rotation in a clockwise sense about the pin 36 so that the upper ends of the fingergrip and handgrip tend to be open relative to one another while the pawl 29 tends to be shifted rearward out of driving engagement with the rear face of the rack tooth immediately before it. The throw of the forward end of the pawl 29 is greater than the spacing between successive teeth 28 of the rack so that repetitive squeezing and relaxing of the fingergrip 31 and handgrip 19 to first move the same toward one another and then allow separation by springback action causes the pawl to engage successive teeth 28 and drive the rack channel forward until the clamping stop 30 abuts the work piece.

If the operator's hand, which is wrapped about the handgrip 19 and fingergrip 31, is now relaxed so that the fingergrip 31 may move away from the handgrip 19, the pawl 29 will disengage from the rack tooth 28 with which it is then in driving engagement to thereby release the clamping stop 30. The work holder is then readily shiftable lengthwise of the work piece if it is desired to make any minor positional adjustments, and is immediately reclampable tightly thereupon by squeezing the fingergrip and handgrip in the normal fashion. It will of course be appreciated that if a stack of boards of the same width are to be successively worked upon, as for example for for cutting the same to a desired length, the work holder according to the invention when once adjusted in the aforedescribed manner may be quickly clamped to and subsequently immediately released from any particular board so that the cutting operations may be carried out in an extremely rapid manner.

Should it become necessary to increase the dimension between the alignment stops 17 and the clamping stop 30, as for example when it is desired to grasp a board wider than that which has just been worked upon, the cross piece 38 may be lifted by a finger placed thereunder to thereby raise the pawl 29 and allow the rack channel 11 to be slid rearward by the desired amount. Similarly, for gross adjustments of the distance between the alignment stops 17 and clamping stop 30 which are intended to shorten the distance therebetween, it is only necessary to longitudinally push or pull the rack channel 11 forward, the pawl 29 automatically riding upward and over each of the rack teeth 28.

With the work holder clamped upon the work piece by the hand gripping action of the operator on the fingergrip 31 and handgrip 19, it will be now appreciated that a portable power tool, as for example a rotary disc saw or a saber saw, may have the side edge of its platform placed in lateral abutment with either of the outside lateral edges 13 of the saw guide and work holder which latter guide the saw as it is moved transversely of the work piece. This arrangement will of course make a right angle cut to the edge abutted by the alignment stops 17. A protractor type guiding edge may be adjustably secured to the web 14 if desired so that cuts at angles other than ninety degrees may be made if desired.

A mark pick-up element designated generally as 40 allows the guide to be positioned rapidly relatively to the work piece to take into account the offset characteristics of the cutting or sawing tool which may be used therewith, this offset resulting from the fact that the cutting blade itself usually projects through a platform carried by the tool at such a point that the edge of the platform extends laterally for a distance with respect to the cutting line of the blade. As best seen in FIGURES 1, 2 and 3, the mark pick-up element 40 consists of a pair of strap or bar arm elements 41 and 42 disposed in overlapped longitudinal continuation of one another, with the overlapped ends being secured together as by means of a screw and nut 43. The outer arm 41 is slotted as at 44 so that it may be shifted longitudinally relative to the inner arm 42 when the clamping screw and nut 43 are loosened, and may then be fixedly secured at its desired overall length by tightening of the screw and nut. The outer end of the outer arm 41 is curved downward as at 45 so that its terminal end is restable upon the underlying work piece to thereby enable any desired offset distance from the outside lateral edge 13 of the web 14 to be established. The inner end of the inner arm 42 is provided with a transversely extending bore alignable with a longitudinally extending bore through a boss 25, and through which bores are projected a removable securing pin 46 which pivotally secures the mark pick-up element 40 to the boss 25.

As illustrated in FIGURE 1, the mark pick-up device is securable for use on either the left hand side or the right hand side of the saw guide and work holder by merely removing the securing pin 46, transferring the pick-up device to the opposite boss and resecuring it thereto with the pin 46, as is for example shown in phantom in FIGURE 1. The spacing of the curved outer end 45 of the mark pick-up element outer arm 41 from the guiding edge 13 of the saw guide may be readily set either by use of a ruler or a tape measure, or may utilize a scale incorporated directly onto the arms of the pick up device itself.

The main body portion 10 of the portable saw guide and work holder is illustrated in the drawings as formed by a unitary cast piece, but it will be appreciated that it could be just as readily fabricated by bolting or welding together of separate parts. The guide may be fabricated for example of aluminum parts, or in some cases may even utilize molded plastic elements of sufficient strength and toughness in order to reduce the weight of the device to such a point that it may be more easily handled for long periods of time.

Having now described my invention in connection with the particularly illustrated embodiment thereof, it will be appreciated that modifications and variations of the invention may now occur from time to time to those persons normally skilled in the art without departing from the essential scope or spirit of my invention, and accordingly it is intended to claim the same broadly as well as specifically as indicated by the appended claims.

What is claimed as new and useful is:

1. A portable saw guide and work holder device adapted for quick securement to and detachment from a work piece, comprising in combination,
   (a) a main body having a substantially planar undersurface adapted to seat downward flatwise upon the work piece and from which depends a pair of laterally spaced apart alignment stops adapted to simultaneously engage one edge of the work piece, at least one outer edge of said main body extending rectilinearly longitudinally at a right angle to the straight line extending between the points of engagement of said alignment stops with the work piece,
   (b) an elongated rack member carried by said main body above the planar undersurface of the latter and being shiftable longitudinally thereof between the said spaced apart alignment stops, said rack member having a clamping stop depending from the end thereof remote from said alignment stops and projecting downward below the undersurface of said main body,
   (c) a handgrip extending upward from said main body by means of which said device may be grasped by one hand and readily positioned as desired with respect to the work piece,
   (d) rack member driving means engaged with said rack member and effective when actuated to drive said rack member longitudinally of said main body to advance said clamping stop toward said alignment stops until the work piece is clamped therebetween, said rack member driving means being carried by said handgrip and including actuating means grippable simultaneously with said handgrip and operable to drive said rack member as aforesaid when so gripped.

2. A portable saw guide and work holder device adapted for quick securement to and detachment from a work piece, comprising in combination, a rigid main body of generally H-shaped configuration having longitudinally extending parallel side legs and a bridging web therebetween, an alignment stop depending from each of said side legs adapted for simultaneous abutment with one edge of a work piece so that the outer edges of said parallel side legs are automatically caused to assume a particular predetermined angle to the said work piece one edge, a tunnel housing carried by said web between said side legs extending longitudinally between the latter, a U-shaped channel member extending longitudinally slidably through and beyond said tunnel housing, said channel member having spaced rack teeth formed on the upper surface of the channel bottom wall and a clamping stop depending from the channel bottom wall to a point below said side legs, a handle fixedly secured to and extending upward from said main body and by means of which said device may be grasped by one hand and readily positioned as desired with respect to the work piece, a hand operated ratcheting assembly carried by said handle and drivingly engaged with the rack teeth formed on the upper surface of said channel member, said ratcheting assembly being repetitively actuatable by operator finger pressure to stepwise advance the clamping stop toward the alignment stops by drivingly engaging successive ones of the said channel member rack teeth.

3. The portable saw guide and work holder device as defined in claim 2 wherein said alignment stops depend from said side legs at particular positions longitudinally of the latter so that simultaneous abutment of said alignment stops with one edge of a work piece automatically aligns the outer edges of said parallel side legs at a right angle to the said work piece one edge.

4. The portable saw guide and work holder device as defined in claim 2 wherein said alignment stops depend from said side legs at particular positions longitudinally of the latter so that simultaneous abutment of said alignment stops with one edge of a work piece automatically aligns the outer edges of said parallel side legs at a right angle to the said work piece one edge, and wherein said tunnel housing is positioned so that said longitudinally extending channel member is slidable therethrough in parallel relation to said side legs.

5. The portable saw guide and work holder device as defined in claim 2 further including a mark pick-up device comprising an extendible arm detachably connected to a first boss projecting upward from said main body with the arm inner end disposed at a point laterally of said channel member and with its outer end extended laterally beyond the side edge of one of said side legs at a distance therebeyond selectively adjustable within limits to thereby establish a desired offset distance between the side edge of said side leg and the proposed line of cut, and another boss to which said mark pick-up device may be detachably connected projecting upward from said main body laterally of said channel member on the opposite side of the latter after said mark pick-up device is first detached from said first boss.

6. A portable saw guide and work holder device adapted for quick securement to and detachment from a work piece, comprising in combination, a rigid main body of generally H-shaped configuration having longitudinally extending parallel side legs and a bridging web therebetween, an alignment stop depending from each of said side legs adapted for simultaneous abutment with one edge of a work piece so that the outer edges of said parallel side legs are automatically caused to assume a particular predetermined angle to the said work piece one edge, a tunnel housing carried by said web between said side legs extending longitudinally between the latter, a U-shaped channel member extending longitudinally slidably through and beyond said tunnel housing, said channel member having spaced rack teeth formed on the upper surface of the channel bottom wall and a clamping stop depending from the channel bottom wall to a point below said side legs, a handle fixedly secured to and extending upward from said main body and by means of which said device may be grasped by one hand and readily positioned as desired with respect to the work piece, a hand operated ratcheting assembly carried by said handle and drivingly engaged with the rack teeth formed on the upper surface of said channel member, said ratcheting assembly including an elongated fingergrip pivotally secured above its lower end to said handle proximate the lower end of the latter and extending upward toward the upper end thereof and also including a pawl element pivotally secured at one end to the lower end of said fingergrip below the pivotal connection of the fingergrip to the handle and having the opposite end of the pawl depressed into said channel member behind one of said rack teeth, and resilient biasing means normally positioning the upper end of said fingergrip away from the upper end of said handgrip to thereby position the pawl element in its maximally retracted position, said fingergrip upper end being repetitively shiftable by operator finger pressure against said biasing means toward the upper end of said handle to drive the pawl element forward behind the rack teeth and shift the channel carried clamping stop stepwise toward the said alignment stops until the work piece is clamped therebetween, clamping pressure being maintained so long as said fingergrip is maintained under finger pressure and being immediately releasable by relaxation of said finger pressure to allow said biasing means to retract said pawl.

7. A portable saw guide and work holder device adapted for quick securement to and detachment from a work piece, comprising in combination, a rigid main body of generally H-shaped configuration having longitudinally extending parallel side legs and a bridging web therebetween, an alignment stop depending from each of said side legs adapted for simultaneous abutment with one edge of a work piece so that the outer edges of said parallel side legs are automatically caused to assume a particular predetermined angle to the said work piece one edge, a tunnel housing carried by said web between said side legs extending longitudinally between the latter and having a portion of the bottom wall thereof longitudinally cut away to provide a pair of side shoulders which define a slot therebetween, a U-shaped channel member extending longitudinally slidably through and beyond said tunnel housing with the channel bottom wall seated on said shoulders, said channel member having spaced rack teeth formed on the upper surface of the channel bottom wall and a clamping stop depending from the channel bottom wall through said tunnel housing slot to a point below said side legs, a handle fixedly secured to and extending upward from said main body and by means of which said device may be grasped by one hand and readily positioned as desired with respect to the work piece, a hand operated ratcheting assembly carried by said handle and drivingly engaged with the rack teeth formed on the upper surface of said channel member, said ratcheting assembly being repetitively actuatable by operator finger pressure to stepwise advance the clamping stop toward the alignment stops by drivingly engaging successive ones of the said channel member rack teeth.

8. A portable saw guide and work holder device adapted for quick securement to and detachment from a work piece, comprising in combination, a rigid main body of generally H-shaped configuration having longitudinally extending parallel side legs and a bridging web therebetween, an alignment stop depending from each of said side legs adapted for simultaneous abutment with one edge of a work piece so that the outer edges of said parallel side legs are automatically caused to assume a particular predetermined angle to the said work piece one edge, a tunnel housing carried by said web between said side legs extending longitudinally between the latter and having a portion of the bottom wall thereof longitudinally cut away to provide a pair of side shoulders which define a slot therebetween, a U-shaped channel member extending longitudinally slidably through and beyond said tunnel housing with the channel bottom wall seated on said shoulders, said channel member having spaced rack teeth formed on the upper surface of the channel bottom wall and a clamping stop depending from the channel bottom wall through said tunnel housing slot to a point below said side legs, a handle fixedly secured to and extending upward from said main body and by means of which said device may be grasped by one hand and readily positioned as desired with respect to the work piece, a hand operated ratcheting assembly carried by said handle and drivingly engaged with the rack teeth formed on the upper surface of said channel member, said ratcheting assembly including an elongated fingergrip pivotally secured above its lower end to said handle proximate the lower end of the latter and extending upward toward the upper end thereof and also including a pawl element pivotally secured at one end to the lower end of said fingergrip below the pivotal connection of the fingergrip to the handle and having the opposite end of the pawl depressed into said channel member behind one of said rack teeth, and resilient biasing means normally positioning the upper end of said fingergrip away from the upper end of said handgrip to thereby position the pawl element in its maximally retracted position, said fingergrip upper end being repetitively shiftable by operator finger pressure against said biasing means toward the upper end of said handle to drive the pawl element forward behind the reck teeth and shift the channel carried clamping stop stepwise toward the said alignment stops until the work piece is clamped therebetween, clamping pressure being maintained so long as said fingergrip is maintained under finger pressure and being immediately releasable by relaxation of said finger pressure to allow said biasing means to retract said pawl.

9. A portable saw guide and work holder device adapted for quick securiment to and detachment from a work piece, comprising in combination, a rigid main body of generally H-shaped configuration having longitudinally extending parallel side legs and a bridging web therebetween, an alignment stop depending from each of said side legs adapted for simultaneous abutment with one edge of a work piece so that the outer edges of said parallel side legs are automatically caused to assume a particular predetermined angle to the said work piece one edge, a tunnel housing carried by said web between said side legs extending longitudinally between the latter, a U-shaped channel member extending longitudinally slidably through and beyond said tunnel housing, said channel member having a clamping stop depending from the channel bottom wall to a point below said side legs, a handle fixedly secured to and extending upward from said main body and by means of which said device may be grasped by one hand and readily positioned as desired with respect to the work piece, a hand operated ratcheting assembly carried by said handle and drivingly engaged with said channel member, said ratcheting assembly being repetitively actuatable by operator finger pressure to stepwise advance the clamping stop toward the alignment stops by drivingly engaging successive longitudinally spaced regions of said channel member.

10. A portable saw guide and work holder device adapted for quick securement to and detachment from a work piece, comprising in combination, (a) a main body having a substantially planar undersurface adapted to seat downward flatwise upon the work piece and from which depends a pair of laterally spaced apart alignment stops adapted to simultaneously engage one edge of the work piece, at least one outer edge of said main body extending rectilinearly longitudinally at a right angle to the straight line extending between the points of engagement of said alignment stops with the work piece, (b) an elongated member carried by said main body above the planar undersurface of the latter and being shiftable longitudinally thereof between the said spaced apart alignment stops, said elongated member having a clamping stop depending from the end thereof remote from said alingnment stops and projecting downward below the undersurface of said main body, (c) a handgrip extending upward from said main body by means of which said device may be grasped by one hand and readily positioned as desired with respect to the work piece,
(d) driving means engaged with said elongated member and effective when actuated to drive said elongated member longitudinally of said main body to advance said clamping stop toward said alignment stops until the work piece is clamped therebetween, said elongated member driving means being carried by said handgrip and operable to drive said elongated member as aforesaid when so gripped.

11. A portable saw guide and work holder device adapted for quick securement to and detachment from a work piece, comprising in combination,
(a) a main body having a substantially planar undersurface adapted to seat downward flatwise upon the work piece and having alignment means depending therefrom adapted to simultaneously engage one edge of the work piece at spaced apart locations along the length of the latter, at least one outer edge of said main body extending rectilinearly longitudinally at a right angle to the straight line extending between the points of engagement of said alignment means with the work piece,
(b) an elongated rack member carried by said main body above the planar undersurface of the latter and being shiftable longitudinally thereof along a line between the said spaced apart points of engagement of said aligment means with the said work piece, said rack member having a clamping stop depending from the end thereof remote from said alignment means and projecting downward below the undersurface of said main body,
(c) a handgrip extending upward from said main body by means of which said device may be grasped by one hand and readily positioned as desired with respect to the work piece,
(d) rack member driving means engaged with said rack member and effective when actuated to drive said rack member longitudinally of said main body to advance said clamping stop toward said alignment means until the work piece is clamped therebetween, said rack member driving means being carried by said handgrip and including actuating means grippable simultaneously with said handgrip and operable to drive said rack member as aforesaid when so gripped.

12. A portable saw guide and work holder device adapted for quick securement to and detachment from a work piece, comprising in combination,
(a) a main body having a substantially planar undersurface adapted to seat downward flatwise upon the work piece and having alignment means depending therefrom adapted to simultaneously engage one edge of the work piece at spaced apart locations along the length of the latter, at least one outer edge of said main body extending rectilinearly longitudinally at a right angle to the straight line extending between the points of engagement of said alignment means with the work piece,
(b) an elongated member carried by said main body above the planar undersurface of the latter and being shiftable longitudinally thereof along a line between the said spaced apart points of engagement of said alignment means with the said workpiece, said elongated member having a clamping stop depending from the end thereof remote from said alignment means and projecting downward below the undersurface of said main body,
(c) a handgrip extending upward from said main body by means of which said device may be grasped by one hand and readily positioned as desired with respect to the work piece,
(d) driving means engaged with said elongated member and effective when actuated to drive said elongated member longitudinally of said main body to advance said clamping stop toward said alignment means until the work piece is clamped therebetween, said elongated member driving means being carried by said handgrip and including actuating means grippable simultaneously with said handgrip and operable to drive said elongated member as aforesaid when so gripped.

References Cited by the Examiner
UNITED STATES PATENTS

| | | | |
|---|---|---|---|
| 2,504,373 | 4/1950 | Andrews et al. | 269—210 |
| 2,823,709 | 2/1958 | Konieczka | 143—6 |

WILLIAM W. DYER, Jr., *Primary Examiner.*

W. D. BRAY, *Assistant Examiner.*